United States Patent Office 3,277,744
Patented Oct. 11, 1966

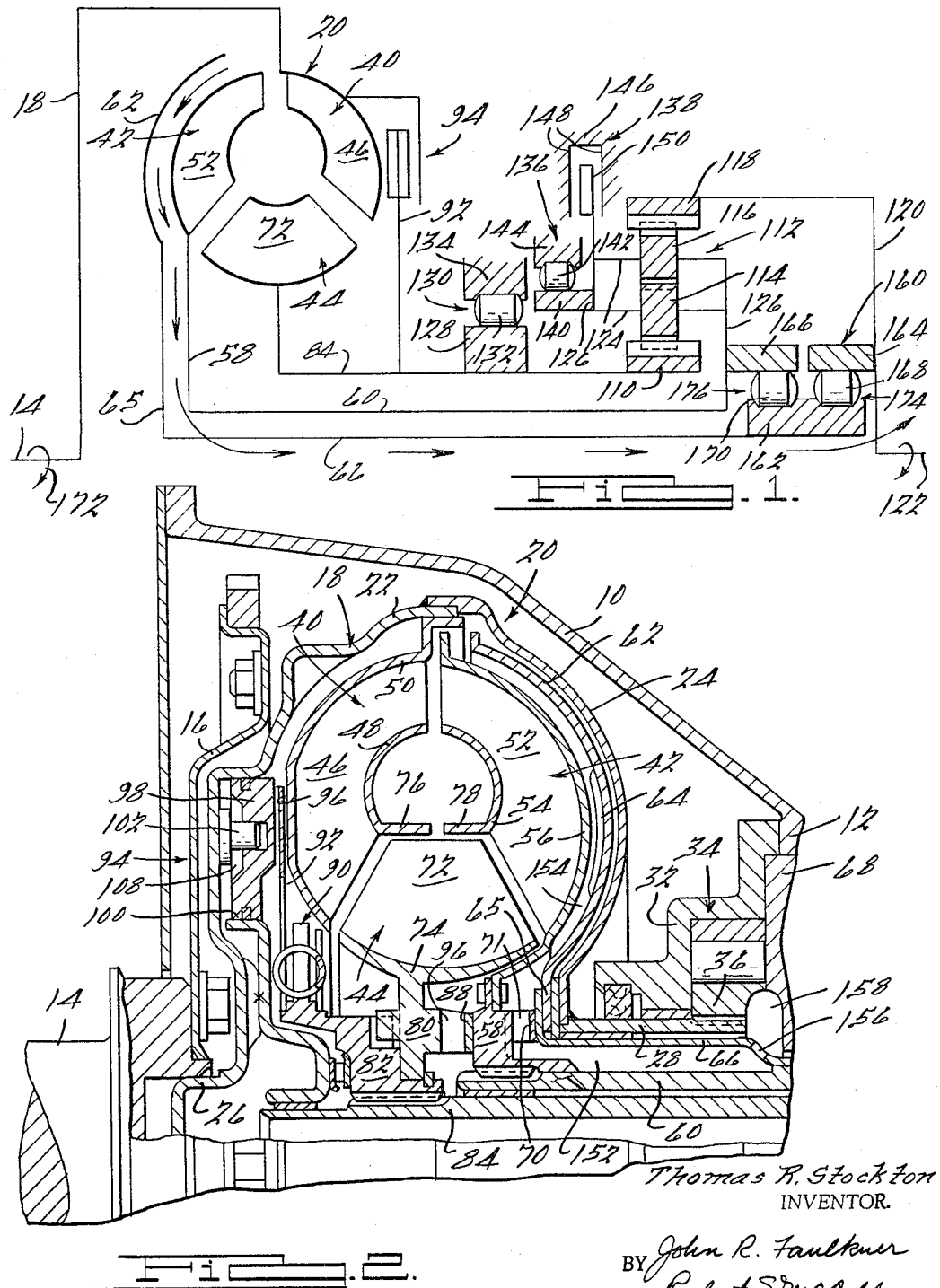

3,277,744
TRANSMISSION
Thomas R. Stockton, Northville, Mich., assignor to Ford Motor Company, Dearborn, Mich., a corporation of Delaware
Filed Dec. 30, 1963, Ser. No. 334,285
8 Claims. (Cl. 74—677)

This invention relates to a transmission construction. More particularly, it relates to one that is automatic in operation, has good operating efficiency, and provides smooth shifts between drive ranges.

One of the objects of the invention is to provide an automatic transmission that is simple in construction, economical to manufacture, and easy to assemble or disassemble.

Another object of the invention is to combine a hydrodynamic torque transmitting device and a single planetary gearset in a manner to provide a number of fluid or mechanical drives, or split torque combined fluid-mechanical drives.

A further object of the invention is to provide an automatic transmission of the type described, in which the hydrodynamic device includes fluid scoop means for progressively scavenging the device of operating fluid and thereby providing a smooth change from a fluid drive to a pure mechanical drive through the transmission.

A still further object of the invention is to provide a transmission as described with overrunning coupling means between the fluids coop means and the output shaft, and between the scoop means and a portion of the hydrodynamic device, to provide progressive braking of several members of the transmission to provide smooth shifts between different drive ranges.

Other objects, features, and advantages of the invention will become apparent upon reference to the succeeding detailed description thereof, and to the drawings illustrating the preferred embodiment thereof; wherein, FIGURE 1 is a schematic representation of a transmission embodying the invention; and, FIGURE 2 is a side elevational view, with parts away and in section, of a portion of the transmission of FIGURE 1.

FIGURE 2, which is essentially to scale, shows the details of construction of the torque converter portion of the transmission embodying the invention, while FIGURE 1 illustrates the complete transmission schematically, and slightly rearranged, for convenience. As shown, the transmission is enclosed by a stationary housing having a forward bell-shaped portion 10 joined to a substantially cylindrical intermediate portion 12. Forward portion 10 receives the terminal end of a power input shaft 14, which is driven by any suitable source of power, such as, for example, the internal combustion engine for a motor vehicle. The shaft is bolted to a conventional flywheel 16, which is drivingly secured to the shell or cover 18 of a hydraulic torque converter 20. The shell has two portions 22 and 24 welded together, portion 22 having a hub 26 piloted within a recess in the input shaft 14. Shell portion 24 is joined to a shaft 28 rotatably and sealingly mounted within the stationary housing 32 of a fluid supply pump 34. The pump has a drive rotor 36 splined to shaft 28.

The torque converter 20 includes a pump or impeller 40, a turbine 42, and a stator-turbine 44. Impeller 40 consists of a number of circumferentially spaced blades 46 secured between inner and outer annular shrouds 48 and 50. The outer shroud 50 is secured to the converter cover portion 22 to be driven by it. The pump faces turbine 42, which is similarly constructed with spaced blades 52 secured between inner and outer annular shrouds 54 and 56. The turbine hub 58 is splined to one end of a sleeve shaft 60 for rotation thereof.

Radially spaced from and surrounding a portion of turbine 42 is an annular fluid scoop member 62 having fluid pumping or guiding fins 64. The hub 65 of the scoop is secured to a sleeve shaft 66 rotatably mounted with respect to shaft 28 and a stationary extension 68 of the transmission housing. The scoop is rotatably separated from the turbine hub 58 by a corrugated spacer-washer 70 providing a fluid passage 71 therebetween.

The stator-turbine member 44 has a number of spaced blades 72 secured to an inner annular shroud 74. Its outer shroud is defined by axial extensions 76 and 78 of the pump and turbine shrouds 48 and 54, respectively. Inner shroud 74 has an extension 80 fixed to a boss 82 splined to a shaft 84. The extension 80 is spaced from the turbine hub 58 by a corrugated spacer-washer 86 providing a fluid passage 88 between the portions. The boss 82 is connected through a known type of vibration damper 90 to an annular friction disc 92. Disc 92 constitutes the driven portion of a selectively operable clutch 94 for establishing a drive of shaft 84 from the power input shaft 14. The disc is located between a flat friction surface 96 on pump shroud 50 and an annular piston 98. The piston is sealingly mounted in a recess 100 defined by the pump shroud, and axially slidable on a pin 102 secured to the shroud. The admission of fluid under pressure through a bore in hub 26 to the chamber 108, defined between the piston and shroud, will engage the input shaft 14 and shaft 84. The clutch is disengaged by suitable spring means, not shown, upon vent of the fluid pressure from chamber 108. The chamber is adapted to be supplied from the fluid pump 34 through control valving, not shown, in accordance with a predetermined schedule.

As best seen in FIGURE 1, the opposite end of shaft 84 is secured to the sun gear 110 of a gearset 112. This gearset is of the planetary type having a planet pinion 114 meshed with a second planet pinion 116 which, in turn, drives a ring gear 118. The ring gear is secured by a radial extension 120 to the power output shaft 122. The pinions 114 and 116 are rotatably mounted on pinion shafts 124 secured in spaced portions of a carrier 126. The carrier is formed as a part of turbine shaft 60.

Sun gear shaft 84 has fixed to it the inner annular race 128 of a one-way or overrunning brake mechanism 130. This brake is of the spring-applied, fluid pressure release type, shown and described more clearly in FIGURE 4 in S.N. 224,715, now Patent No. 3,209,620, entitled "Transmission," Richard D. Moan, filed August 9, 1962. It has a number of rollers or sprags 132 separating race 130 from an outer race 134 fixed to a stationary portion of the transmission housing. The rollers are biased by springs, not shown, into a position wedging the races 128 and 134 together upon counterclockwise rotational tendency of race 128 relative to stationary race 134, thus preventing rotation of the stator 44 and sun gear 110 in this direction. Rotation of the stator and sun gear in the opposite direction, i.e., clockwise, relative to the outer race 134, moves the rollers against the springs to a position permitting this clockwise relative rotation of race 128. As will become clear later, it is desirable at times, such as, for example, during reverse drive, to render this brake inoperative to permit reverse or counterclockwise rotation of race 128 relative to race 134. This is accomplished by admitting fluid under pressure to the brake to move the rollers to inoperative positions.

To establish different drives through the transmission, and smooth changes between drives, carrier 126, and turbine 42, are adapted to be held against rotation in one direction alone, or in either direction. This is accomplished by means of a one-way brake 136, and a friction brake 138. The carrier 126 has a portion 140 constituting the inner annular race for the one-way or overrunning brake 136. This brake is of a known mechanical type, and has spaced sprags or rollers 142 separating race 140 from an outer stationary race 144. Race 144 is formed as an extension of the stationary housing. The brake locks up, upon reverse or counterclockwise rotation of carrier 126 and turbine 42, by rollers 142 wedging the two races together, and unlocks upon clockwise rotation of the carrier and turbine to permit free rotation in this latter direction.

The friction brake 138 comprises a stationary outer portion 146 having friction surfaces 148 adapted to cooperate with a friction disc 150. The disc 150 constitutes an extension of carrier 126, and is fixed to inner race 140 of one-way brake 136. The brake is of the known fluid pressure engaged, spring-released type. Engagement of the brake prevents rotation of the carrier 126 and turbine 42 in either direction, for hill braking and intermediate speed operation.

Turning now to the operation of torque converter 20, it is adapted to be completely filled by the flow of operating fluid through the annular space 152 between the shafts 66 and 60, and the passage 154 between the turbine shroud 56 and scoop member 62. Passage or space 152 is connected, via a fluid pressure control system, to the outlet of pump 34 through a hole 156 and a manifold 158. The details of the control system have not been shown, since they are believed to be unnecessary for an understanding of the invention. The converter is also emptied through this same path, when desired, as controlled by a suitable valve in the control system alternately movable between fluid supply, passage closed, and fluid vent positions. When filled, the inner and outer shrouds of the pump 40, turbine 42, and stator member 44 together define a toroidal path for the circulation of fluid between the pump and the turbine in a known manner to multiply the torque at low turbine speeds, while merely transmitting the torque without multiplication at higher turbine speeds.

The fluid scoop member 62 is used to scavenge the operating fluid from the converter. For this purpose, its rotation is adapted to be controlled by a mechanical overrunning combined clutch-brake assembly 160. The fluid scoop means 62 and its shaft 66 are fixed to the common inner race 162 for assembly 160. It has two outer races 164 and 166. Race 164 is secured to the output shaft 122 and is separated from race 162 by sprags or rollers 168. The sprags 168 lock up to prevent faster rotation of the fluid scoop means 62 in a clockwise direction than the output shaft, while permitting forward or clockwise rotation of the output shaft relative to the scoop means.

The race 166 is fixed to the carrier 126 and turbine 42, and is separated from race 162 by sprags 170. This unit prevents clockwise rotation of the scoop means 62 faster than the turbine 42, while permitting overrun of the turbine clockwise with respect to the scoop means.

The two overrunning units together provide for the progressive emptying of the converter and change in drive.

When the converter is filled, the control valve, not shown, is closed, and the scoop member 62 is forced to rotate at the speed of output shaft 122. Since the control valve is closed, however, the converter remains filled and operative. The small amount of drag on the fluid between the slower rotating scoop and the turbine is substantially negligible. The fluid filled condition of the converter provides a fluid drive of the gearset during certain phases of operation, such as first and third speed drives and reverse. The converter is emptied to permit establishment of other drives, such as intermediate speed.

When the control system signals for emptying the converter, the fluid control valve moves to permit an ejection of the operating fluid from the converter to the fluid sump. Since the scoop is already rotating at approximately one-half the speed of turbine 42, or at the speed of output shaft 122, the relative rotation between the turbine and scoop member causes the converter to start emptying of fluid by it being pumped out of the converter to the sump through the passages 154 and 152; that is, the centrifugal head on the rotating mass of operating fluid in the converter forces the fluid through the passage 154. The converter then begins losing its torque transmitting capacity, and the turbine begins to slow down. Subsequent braking of the turbine, in a manner to be described, by engagement of one-way brake 136 and brake 138, if desired, will then completely empty the converter.

When it is desired to fill the converter, brake 138 is released, and the converter control valve is moved to a position closing the converter exhaust passage, and opening manifold 158 to the fluid supply from pump 34. The impeller 40 then again rotates the turbine and scoop members together.

For a quicker understanding of the complete operation, it should be noted that the clutch 94 is used in connection with the establishment of intermediate and high speed drive; the torque converter 20 is filled for low and high, and reverse speed operations; the brake 138 is used when establishing intermediate speed drive and reverse, as well as hill brake condition; the one-way brake 136 is used for intermediate speed operation; the releasable brake 130 for low speed; and the overrunning assembly 160 for controlling the emptying of the converter 20.

In operation, neutral is established by emptying the converter of operating fluid, and disengaging clutch 94 and brake 138. No drive is transmitted from the impeller or pump 40 to the remaining portions of the transmission.

First or low speed operation is obtained merely by filling the converter through passages 152, 154, the one-way brake 130 being spring-biased to an operative position. Once filled, the converter control valve is closed. Forward or clockwise rotation of input shaft 14 in the direction of arrow 172 rotates the pump and turbine members 40 and 42 in the same direction, causing stator 44 to attempt to rotate in an opposite direction. This rotation, however, is prevented by the engagement of one-way brake 130. The stator and sun gear 110 are thus held stationary to provide torque multiplication through the converter and gearset in a known manner. The forward rotation of turbine 42 drives carrier 126 in the same direction. The initial resistance to movement of output shaft 126, due to the load impressed thereon, causes the pinions 114 to attempt to rotate sun gear 110 in a reverse direction; however, this is prevented by the one-way brake 130. The ring gear is thus forced to rotate clockwise to drive the output shaft 126 in the same direction, and at a speed reduced from that of shaft 16, such as, for example, at .445 turbine speed. The one-way clutch 174 now engages causing the scoop means 62 to rotate at .445 turbine speed The control valve is closed, however, and this relative rotation has virtually no effect. The coupling 176 overruns at this time.

When the control system indicates that a change from low speed to intermediate speed operation should be made, the control valve is opened so that the converter can empty to the fluid sump. Immediately, the relative rotation between the turbine and scoop member, caused by clutch 174, partially empties the converter, causing it to lose its capacity to transmit torque. The turbine and carrier 126 then slow down. In timed relationship, clutch 94 is engaged to begin to rotate the sun gear 110 off the one-way brake 130 in a clockwise direction as soon as the carrier stops rotating. At the instant the gun gear begins rotating clockwise, the direction of torque application on the carrier has reversed. The one-way brake 136 then engages to hold the carrier stationary, and render it as the gearset reaction member. This, of course, brakes the turbine completely, and by engagement of coupling 176, brings the scoop means to a stop. Thus, the converter now empties completely, breaking the torque line from the pump to the carrier. The transmission is now in intermediate drive. The ring gear is carried around by the pinions 116, and output shaft 122 rotates at a speed faster than that during low speed operation. The drive during this stage of operation is a pure mechanical one, from shaft 14 through clutch 94 to shaft 84 and sun gear 110.

During intermediate drive, the brake 138 may be engaged, or not, as desired, to provide engine braking when the vehicle coasts during this drive range. That is, coast of the vehicle would rotate the carrier off the one-way brake 136, and permit runaway of the vehicle; the brake 138 would prevent this by maintaining the gearset conditioned for a reduction intermediate drive.

It will be seen, therefore, that the change between low and intermediate speed operation is accomplished automatically and smoothly, upon opening of the converter fluid outlet, by the pickup shift provided by the braking of the scoop member and turbine, by operation of the one-way couplings 174, 136, and 176.

When the control system dictates that high speed or direct drive should be established, the converter fluid control valve is moved to fill the converter and block its exhaust to the sump. Brake 138 is disengaged to permit rotation of the turbine 42 and scoop member 62. The clutch 94 remains engaged. The converter begins operating and quickly passes through its torque multiplying operation to its fluid coupling stage to transmit the torque of the input shaft to both the sun gear 110 and carrier 126. Thus, both the carrier and sun gear are rotating substantially at engine speeds, providing a lockup of the gearset to establish a split torque fluid-mechanical drive of the output shaft 122 substantially at the speed of input shaft 14. The one-way couplings merely overrun or engage with no effect.

To establish reverse drive, clutch 94 is released; converter 20 is filled with fluid, and the control valve closed; brake 138 is applied to prevent rotation of carrier 126 and both scoop 62 and turbine 42 (by engagement of 176), and fluid pressure is admitted to brake 130 to render it inoperative. Clockwise rotation of input shaft 14 drives the pump 40 in the same direction. With the turbine 42 stationary, the fluid discharged from its blades strikes the backs of the stator blades 72 to rotate them in a counterclockwise or reverse direction. This drives the sun gear 110 in the same direction, this being permitted by the inoperativeness of one-way brake 130. With the carrier as a reaction member, the ring gear 122 and output shaft 126 are driven in a direction opposite to that of the input shaft 14, and at a speed reduced from that of shaft 14.

While the invention has been illustrated in its preferred embodiment in the drawings, it will be clear to those skilled in the arts to which the invention applies that many changes and modifications may be made thereto without departing from the scope of the invention.

I claim:

1. A transmission comprising, power input and output shafts, a fluid drive device of the fill and empty type driven by said input shaft and having a fluid outlet selectively closed or opened, a planetary gearset having rotatable members at least one of which is connected to said output shaft, means for driving a second of said members from said drive device when filled while holding a third of said members stationary to establish one reduction drive, rotatable fluid scoop means associated with and fluid driven by said drive device and mounted for a relative rotation therebetween, and engageable means between said output shaft and said scoop means preventing rotation of said scoop means in one direction faster than said output shaft, the braking of the rotation of said scoop means and the opening of said fluid outlet emptying the fluid from said device, and means to drive said third member from said input shaft while holding said second member stationary when said device is emptied of fluid to establish another drive.

2. A transmission comprising, power input and output shafts, a fluid drive device of the fill and empty type driven by said input shaft and having a fluid outlet selectively opened or closed, a planetary gearset having rotatable members at least one of which is connected to said output shaft, means for driving a second of said members from said drive device when filled while holding a third of said members stationary to establish one reduction drive, rotatable fluid scoop means fluid driven by said drive device and mounted for a relative rotation therebetween, clutch means connecting said scoop means and said output shaft for rotation together at the same speed to partially empty the fluid from said device upon opening of said fluid outlet, and means to subsequently brake a portion of said drive device to completely empty said device, and means to drive said third member from said input shaft while holding said second member stationary when said device is emptied of fluid to establish another drive.

3. A transmission comprising, power input and output shafts, a fluid drive device of the fill and empty type driven by said input shaft and having a fluid outlet selectively opened or closed, a planetary gearset having rotatable members at least one of which is connected to said output shaft, means for driving a second of said members from said drive device when filled while holding a third of said members stationary to establish one reduction drive, rotatable fluid scoop means fluid driven by said drive device and mounted for a relative rotation therebetween, clutch means connecting said scoop means and said output shaft for rotation together at the same speed to partially empty the fluid from said device upon opening of said fluid outlet, brake means for braking a portion of said device including one-way means between said scoop means and a portion of said drive device, means to subsequently brake said scoop means upon braking of said portion to completely empty said device, and means to drive said third member from said input shaft while holding said second member stationary when said device is emptied of fluid to establish another drive.

4. A transmission having power input and output shafts, and means connecting said shafts providing a plurality of drives therebetween, said means including a hydrodynamic drive device and a planetary gearset, said gearset having drive and driven and other rotatable members, said drive device having fluid filled and emptied conditions of operation to transmit or interrupt the transmission of torque therethrough and having drive and driven rotatable elements and a fluid outlet selectively opened or closed, means connecting said input shaft to said drive element and a driven element to one member of said gearset, means connecting said driven member to said output shaft, releasable brake means for holding another of said members stationary to condition said gearset for a drive therethrough during a filled condition of said device, fluid scoop means fluid driven by said driven element and mounted for a relative rotation therebetween, means between said output shaft and said scoop means for braking the rotation of said scoop means for partially scavenging fluid from said drive device upon opening of said fluid outlet, and other brake means for holding said driven element against rotation at times to completely empty said device and interrupt the drive therethrough.

5. A transmission having power input and output shafts, and means connecting said shafts providing a plurality of drives therebetween, said means including a hydrodynamic drive device and a planetary gearset, said gearset having drive and driven and other rotatable members, said drive device having fluid filled and emptied conditions of operation to transmit or interrupt the transmission of torque therethrough and having drive and driven rotatable elements and a fluid outlet selectively opened or closed, means connecting said input shaft to said drive element and a driven element to one member of said gearset, means connecting said driven member to said output shaft, releasable brake means for holding another of said members stationary to condition said gearset for a drive therethrough during a filled condition of said device, fluid scoop means fluid driven by said driven element and mounted for a relative rotation therebetween, means between said output shaft and said scoop means for braking the rotation of said scoop means for partially scavenging fluid from said drive device upon opening of said fluid outlet, other brake means for holding said driven element against rotation at times to completely empty said device and interrupt the drive therethrough, and disengageable means connecting said input shaft and said another member to provide another drive upon release of said brake means.

6. A transmission comprising, power input and output shafts, a hydraulic torque converter having a fluid outlet selectively closed or opened to provide fluid filled and emptied conditions of operation, and having a pump and a plurality of turbines, a planetary gearset having meshing sun and ring and pinion gears and a planet carrier, means connecting said input shaft to said pump and said ring gear to said output shaft, means connecting one of said turbines to said carrier and a second turbine to said sun gear, fluid scoop means fluid driven at times by said one turbine and mounted for a relative rotation therebetween, one-way coupling means between said scoop means and said output shaft preventing overrun in one direction of said scoop means with respect to said output shaft, releasable means for holding said sun gear and second turbine against rotation in one direction to establish one reduction drive to said output shaft from said input shaft in the filled condition of said converter, said one-way means initially braking said scoop means with respect to said first turbine to partially scavenge said converter of fluid upon opening of said fluid outlet, further brake means to prevent rotation of said first turbine and carrier to completely empty said converter and condition said gearset for another drive, and means connecting said input shaft and sun gear to provide said another drive.

7. A transmission comprising, power input and output shafts, a hydraulic torque converter having a fluid outlet selectively closed or opened to provide fluid filled and emptied conditions of operation, and having a pump and a plurality of turbines, a planetary gearset having meshing sun and ring and pinion gears and a planet carrier, means connecting said input shaft to said pump and said ring gear to said output shaft, means connecting one of said turbines to said carrier and a second turbine to said sun gear, fluid scoop means fluid driven at times by said one turbine and mounted for a relative rotation therebetween, one-way coupling means between said scoop means and said output shaft preventing overrun in one direction of said scoop means with respect to said output shaft, releasable means for holding said sun gear and second turbine against rotation in one direction to establish one reduction drive to said output shaft from said input shaft in the filled condition of said converter, said one-way means initially braking said scoop means with respect to said first turbine to partially scavenge said converter of fluid upon opening of said fluid outlet, further brake means to prevent rotation of said first turbine and carrier to completely empty said converter and condition said gearset for another drive, and means connecting said input shaft and sun gear to provide said another drive, said further brake means including one-way overrunning means between said carrier and said scoop means preventing rotation in one direction of said scoop means relative to said first turbine to permit the complete emptying of said converter of fluid upon the braking of said carrier.

8. A transmission comprising, power input and output shafts, a hydraulic torque converter having a fluid outlet selectively closed or opened to provide fluid filled and emptied conditions of operation, and having a pump and a plurality of turbines, a planetary gearset having meshing sun and ring and pinion gears and a planet carrier, means connecting said input shaft to said pump and said ring gear to said output shaft, means connecting one of said turbines to said carrier and a second turbine to said sun gear, fluid scoop means fluid driven at times by said one turbine and mounted for a relative rotation therebetween, means for holding said sun gear and second turbine against rotation in one direction to establish one reduction drive to said output shaft from said input shaft in the filled condition of said converter, brake means to prevent rotation at times of said first turbine and carrier, and means connecting said input shaft and sun gear to provide another drive, one-way coupling means between said scoop means and said output shaft and between said scoop means and said carrier operable initially to retard rotation of said scoop means to enable partial emptying of said converter upon opening of said fluid outlet, and subsequently to completely brake said scoop means to completely empty said converter upon application of said brake means for said carrier.

No references cited.

DAVID J. WILLIAMOWSKY, *Primary Examiner.*

T. C. PERRY, *Assistant Examiner.*